Nov. 25, 1952  D. H. GOODWILLIE  2,618,819
EDGING STRIP
Filed May 2, 1947

Inventor
David H. Goodwillie
By Nobbe & Swope
Attorneys

Patented Nov. 25, 1952

2,618,819

UNITED STATES PATENT OFFICE 2,618,819

EDGING STRIP

David H. Goodwillie, Toledo, Ohio, assignor to Libbey-Owens-Ford Glass Company, Toledo, Ohio, a corporation of Ohio Application May 2, 1947, Serial No. 745,508

5 Claims. (Cl. 20—56.5)

The present invention relates broadly to integral, multiple wall, insulating structures, and more particularly to a novel type of edge cushioning and sealing strip especially adapted for incorporation into multiple glass sheet glazing units.

Generally speaking, such units are made up of two or more sheets of glass, or other transparent material, arranged in spaced face to face relation to one another, and maintained in this position by spacer or separator means secured to adjacent faces of the glass sheets around their margins or perimeters. In this way a unitary structure is created having an internal air space, or spaces, between the glass sheets and within which special predetermined conditions can be set up and maintained.

The value of multiple sheet glazing units as insulation against heat and cold, and as a means for preventing clouding and frosting of windows and other sight openings, is well known. However, for such glazing units to function at their maximum efficiency, it is essential that they be constructed in such a way that moisture and other foreign matter will never be present in the space between the glass sheets to an extent that will cause objectionable soiling of the inside of the unit by dust and dirt particles, or by steaming and staining of the glass from condensation of water vapor within the unit.

The usual way of eliminating the possibility of dirt or excess humidity being present in a multiple sheet glazing structure is by hermetically sealing the unit after first having conditioned or rarefied the contained air. An outstanding example of this type of structure is the Libbey-Owens-Ford Glass Company's all glass and metal "Thermopane," covered in Patent No. 2,235,681, issued March 18, 1941.

An important aim of this invention is to provide, in a double glazing unit of the above or similar character, an auxiliary edge sealing filling and cushioning strip that will greatly increase the efficiency, effective life, and appearance of the unit.

Briefly stated, the edge strip of the invention comprises a flexible and resilient band or frame that extends entirely around the edges of the glazing unit, fitting tightly thereagainst, and provided with a centrally disposed, inwardly extending portion that fits into the space between the adjacent glass sheets.

It is an object of the invention to provide an edge strip of this general character that will protect the edges and corners of the glass sheets and, in the case of hermetically sealed units, the bond between the separator and the glass, from breakage or rupture during handling, shipping and installation of the unit.

Another object is the provision of an edge strip of the above type that will supplement the sealing action of the separator means and so provide a more tightly and permanently sealed unit.

Another object is to provide such an edge strip that will act as a cushion for the unit when it is mounted in a window frame, and that will be sufficiently compressible to accommodate itself to inequalities in the frame and give a more uniform and equalized support for the unit.

A further object is the provision, in a multiple sheet glazing unit in which the separator means is located inwardly of the edges of the glass sheet, of an edge strip of the character which will plug or fill the channel that lies between the glass sheets and outwardly of the separator means.

Still another object is to provide, in such channel type unit, a sealing and cushioning strip that will give a flat, finished edge to the unit.

Other objects and advantages of the invention will become more apparent during the course of the following description, when taken in connection with the accompanying drawings.

In the drawings, wherein like numerals are employed to designate like parts throughout the same:

Figure 1:
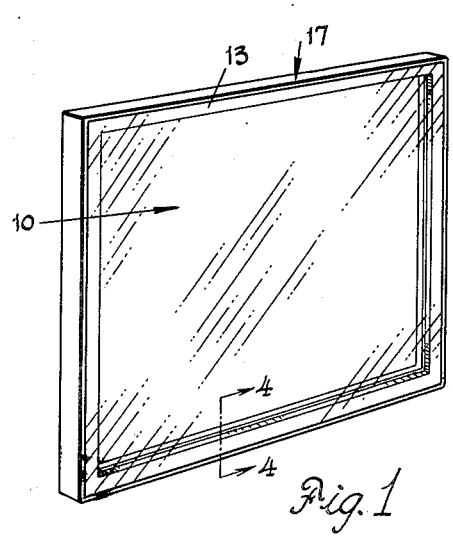
Fig. 1 is a perspective view of a double glazed unit produced in accordance with the invention.

Such units, generally speaking, consist of two sheets of glass 11 and 12, arranged in spaced face to face relation to each other and maintained in this position by a metal separator strip 13. The separator is permanently secured to the opposed faces of the glass sheets, inwardly of their edges, through the intermediary of metallic coatings 14, deposited on and tightly adherent to the inner margins of the glass sheets, and a tight solder joint 15 between the metal coatings 14 and the separator strip 13.

When units of this kind leave the factory they have had the space 16 between the glass sheets partially evacuated, or filled with gas; or the space may simply contain dehydrated air at normal atmospheric pressure. In any event, however, the space 16 between the sheets has been hermetically sealed so that, as long as the seal is maintained unbroken, the controlled conditions that were originally set up within the unit can be permanently maintained.

According to the present invention there is provided a novel form of edge strip to be used with such units and which will serve to protect the unit from any injury, to either its glass or metal components, that would tend to destroy the seal and so shorten the effective life of the unit.

Figure 2:
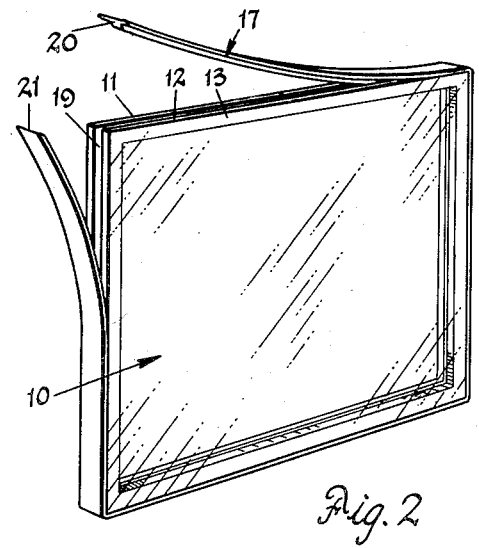
Fig. 2 is a perspective view of a duoble walled glazing unit showing one form of the edge strip of the invention wound around the edges of the unit preparatory to joining the two ends.
Figure 4:
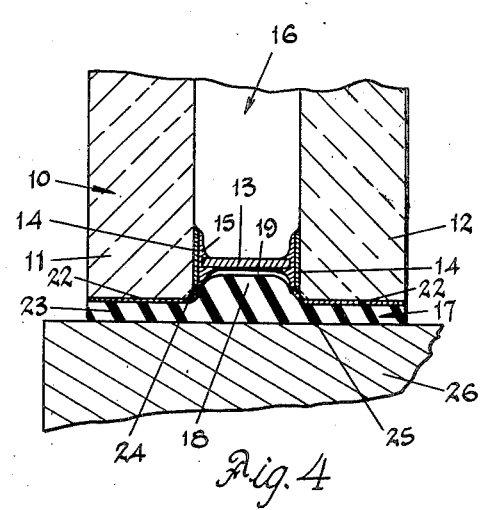
Fig. 4 is a fragmentary, sectional view taken substantially along the line 4—4 in Fig. 1.

A preferred form of this protective edge strip is shown in Figs. 1, 2 and 4 of the drawings, and comprises a flat length of sponge rubber or other compressible, resilient material 17. Other forms of natural or synthetic rubber, or semi-resilient organic materials such as synthetic plastics may also be used. The flat rubber strip is preferably of the same width as the thickness of the unit to which it is to be applied, and is provided with a raised central rib or extension 18 extending throughout its entire length and which is shaped to fit into the opening 19 between the margins of the glass sheets.

Figure 3:
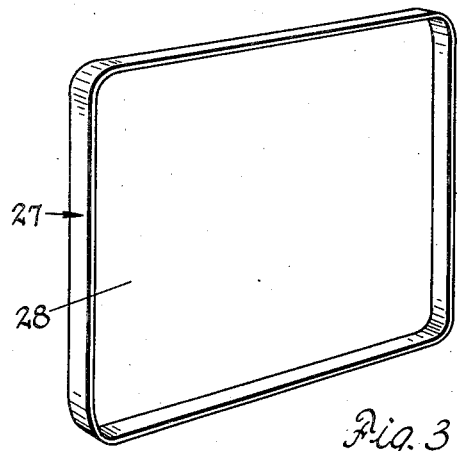
Fig. 3 is a perspective view of a modified form of edge strip which can be stretched into place around the edges of a double glazed unit.

The edge strip 17 may be applied to the unit in a number of different ways, for example, it may be made in a flat band as indicated above, in which case it is wound around the unit as shown in Fig. 2, and the mitered ends 20 and 21 then vulcanized or otherwise permanently secured together. Another method of applying the strip is to use four separate pieces of the same length as the sides of the unit on which they are to fit, then mitering the meeting edges of the several strips and vulcanizing them together. Or, where the edge strip is made of a sufficiently elastic material, a frame such as indicated in Fig. 3, and which is slightly smaller than the unit to which it is to be applied, is made and then strecthed into place around the unit.

Regardless of the manner in which the edge strip is fitted to the unit it is desirable, although not absolutely essential, to first apply an adhesive 22 to at least those portions of the strip that contact the edges of the glass sheets. Such an adhesive not only acts to hold the strip permanently in place, but also provides an additional sealing means against the entry of air and moisture into the unit.

Fig. 4 illustrates a preferred method of positioning and cementing the strip against the edges of the unit. As shown there, the flat portion 23 of the strip has its inside margins on either side of the central rib 18 coated with the adhesive 22 which tightly adheres the strip to the edges of the glass sheets.

Any suitable cement that will stick the material of the strip to glass, and which is impermeable to, or has a low transmission for, air and water vapor is suitable for the purpose. In the case of a rubber strip, Minnesota Mining Company's rubber base cement which is sold under the trade name "EC-613" will give good results.

It will be noted that in Fig. 4 the central rib 18 is shaped to fit into the space 19 between the glass sheets 11 and 12 and tightly against the inner corners 24 of the glass and a part of the metallic coatings 14 and solder joint 15. It may also be cemented along these areas as indicated at 25. However, the rib 18 is entirely out of contact with the separator 13 itself, and this is desirable in order to insure that when the unit is resting on the edge strip against a sill or other support 26 no load will be transmitted to the separator strip that would tend to rupture the seal between it and the glass.

As pointed out above, a multiple wall glazing unit, when fitted with the edge separator strip just described, will be much more resistant to shocks and blows, that would ordinarily fracture the glass or break the seal of an unprotected unit, because of the cushioning action of the edge strip. In addition, the appearance of the unit is improved by the flat, unbroken exterior of the strip which fills or plugs the opening between the glass sheets and gives a finished edge.

The edge strip will also provide a supplemental sealing means, thus making a double-sealed unit and presenting added resistance to the tendency of air or water vapor to enter the space between the glass sheets.

Another advantage of the novel edge cushioning and sealing strip is in connection with the mounting of the units. Thus, particularly in the case of large sized units such as are used in picture windows, store fronts, large display cases and so forth, it is important that they have a support for their bottom edges that is perfectly level both longitudinally and transversely. Otherwise, the load of the unit will not be uniformly distributed and, as a consequence, one of the glass sheets will carry a greater portion of the unit weight than the other and this sets up strains and stresses within the unit structure that tend to rupture the glass-to-metal seal.

Heretofore, it was necessary that the sill or other supporting means for the bottom edge of the unit be made perfectly level and free from inequalities that might interfere with a proper weight distribution. Now, however, the cushioning strip of this invention will accommodate itself to many inequalities in the surface upon which the unit is supported, and will act to distribute the weight uniformly over the length and thickness of the unit even when the supporting surface is not absolutely level.

Figure 5:
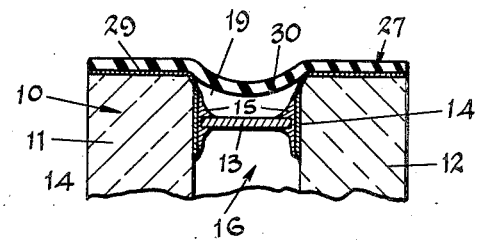
Fig. 5 is a fragmentary, sectional view similar to Fig. 4 but taken at the top edge of the double glazed unit and showing a modified form of edge strip.

In Figs. 3 and 5 there is illustrated a modified form of edge strip which in its original form (Fig. 3) is a plain resilient continuous rubber band or frame 27 which defines an opening 28 that is slightly smaller than the unit to which the band is to be applied. This edge strip 27 is applied by simply stretching it over the unit to be edged so that it fits tightly therearound and exerts a constant inward pressure against all four edges of the unit. As shown in Fig. 5, an adhesive 29 may be applied to the edges of the glass sheets, or to the edge band, before the latter is applied to the unit, as a further securing means.

Although the edge strip 27 may be perfectly plain and flat in its original state, and before application to the unit, once it is on the unit the tension of the band will cause it to belly into the opening between the glass sheets along its longitudinal center line as shown at 30 to give the inwardly projecting center rib that is common to the several forms of the invention.

Of course, a preformed rib such as the rib 18 in Fig. 4 could also be provided on the band 27 if desired.

While this special type of edge cushioning, and sealing strip has been described in connection with all glass and metal, hermetically sealed, "Thermopane" units, it will be understood that it can also be used with equal advantage on units that are not hermetically sealed and on units employing organic or other types of separator strips. In certain types of units it may also be desirable to have the central longitudinal bead extend inwardly into tight contact with the separator strip, and completely fill the opening defined by the inner margins of the glass sheets and the separator means.

In fact, it is to be understood that while the forms of the invention herein shown and described are to be taken as the preferred embodiments of the same, various changes in the shape, size and arrangement of parts may be resorted to without departing from the spirit of the invention or the scope of the subjoined claims.

I claim:

1. A glazing unit comprising a plurality of transparent panels arranged in spaced face to face relation, separator means between said panels around the margins thereof, and a sealing strip comprising a continuous band of resilient material having a free length that is less than the length of the perimeter of said unit stretched around the edges of said unit and exerting pressure thereagainst.

2. A glazing unit comprising a plurality of transparent panels arranged in spaced face to face relation, separator means between said panels around the margins and inwardly of the edges thereof, and an endless resilient band having a free length that is less than the length of the perimeter of said unit stretched around the perimeter of the unit and bellying into the space between the glass sheets.

3. A multiple walled unit including oppositely disposed parallel panels, separator means arranged between said panels around the margins and inwardly of the edges thereof creating a marginal space therebetween, and a sealing strip of a compressible material wrapped around the perimeter of the unit and having a portion extending inwardly and fitting into said marginal space but out of contact with the main body portion of said separator means.

4. A multiple walled unit including oppositely disposed parallel panels, separator means arranged between said panels around the margins and inwardly of the edges thereof creating a marginal space therebetween, and a tensioned sealing strip of a resilient compressible material wrapped and stretched around the perimeter of the unit and exerting pressure thereagainst, said strip when so positioned having a portion thereof extending inwardly and fitting into the said marginal space but being out of contact with the main body portion of said separator means.

5. A multiple walled unit including oppositely disposed parallel panels, separator means arranged between said panels around the margins and inwardly of the edges thereof creating a marginal space therebetween, a sealing strip of a compressible material wrapped around the perimeter of the unit and having a portion extending inwardly and fitting into said marginal space but out of contact with the main body portion of said separator means, and a flat unbroken exterior surface extending entirely around the unit.

DAVID H. GOODWILLIE.

REFERENCES CITED

The following references are of record in the file of this patent:

UNITED STATES PATENTS

| Number | Name | Date |
|---|---|---|
| 1,851,515 | Hunt et al. | Mar. 29, 1932 |
| 2,030,869 | Haven | Feb. 18, 1936 |
| 2,077,305 | Batchell | Apr. 13, 1937 |
| 2,138,374 | Edwards | Nov. 29, 1938 |
| 2,145,930 | Herron | Feb. 7, 1939 |
| 2,329,567 | Verhagen | Sept. 14, 1943 |
| 2,336,544 | Hopfield | Dec. 14, 1943 |
| 2,378,031 | Paddock | June 12, 1945 |

FOREIGN PATENTS

| Number | Country | Date |
|---|---|---|
| 260,115 | Great Britain | 1926 |